(12) United States Patent
Huang et al.

(10) Patent No.: US 8,170,624 B1
(45) Date of Patent: May 1, 2012

(54) ENHANCED HOST SLEEP FOR WLAN DEVICES

(75) Inventors: Frank Huang, Pleasanton, CA (US); James Kang-Wuu Jan, San Jose, CA (US); Robert Lee, Fremont, CA (US); Sandesh Goel, Fremont, CA (US); Bing Zhao, Fremont, CA (US); Yao Chen, San Jose, CA (US); Chen Fan, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 616 days.

(21) Appl. No.: 11/939,276

(22) Filed: Nov. 13, 2007

Related U.S. Application Data

(60) Provisional application No. 60/865,331, filed on Nov. 10, 2006.

(51) Int. Cl.
*H04B 1/38* (2006.01)
*H01Q 11/12* (2006.01)

(52) U.S. Cl. ............... 455/574; 455/127.1; 455/127.5; 455/343.1; 455/343.5

(58) Field of Classification Search .............. 455/574, 455/127.1, 127.5, 343.1, 343.5
See application file for complete search history.

(56) References Cited

U.S. PATENT DOCUMENTS

| | | | | |
|---|---|---|---|---|
| 7,133,374 | B2 * | 11/2006 | Lo et al. | 455/343.3 |
| 7,502,635 | B1 * | 3/2009 | Horikoshi et al. | 455/574 |
| 7,684,835 | B1 * | 3/2010 | Vu et al. | 455/574 |
| 7,685,606 | B2 * | 3/2010 | Chang | 455/574 |
| 2002/0132603 | A1 * | 9/2002 | Lindskog et al. | 455/343 |
| 2005/0059386 | A1 * | 3/2005 | Li | 455/420 |
| 2005/0221869 | A1 * | 10/2005 | Liu et al. | 455/574 |
| 2007/0036096 | A1 | 2/2007 | Sinivaara | |
| 2007/0238437 | A1 * | 10/2007 | Jaakkola | 455/343.1 |

OTHER PUBLICATIONS

DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band, IEEE P802.11g/D8.2 (Apr. 2003).

TGn Sync Proposal Technical Specification, IEEE P802.11 Wireless LANs, Abstract (2005).

Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band, IEEE Std 802.11a (1999).

(Continued)

*Primary Examiner* — Wen Huang

(57) ABSTRACT

In a method and apparatus for controlling operation of a wireless device, a host assembly of the wireless device enters into a handshaking procedure with firmware of the wireless device to initiate entry into or exit from a host sleep mode. Before such entry or exit, the handshaking procedure may require the host assembly to send an initiation handshake signal to the firmware, and require the firmware to send a confirmation handshake signal back to the host assembly. Entry or exit may be delayed until after the confirmation signal is received. The confirmation signal may vary depending on the handshaking configuration and activation data, and the confirmation signal may vary depending on whether the wireless device is in a power save mode or not.

25 Claims, 7 Drawing Sheets

OTHER PUBLICATIONS

Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-speed Physical Layer Extension in the 2.4 GHZ Band, IEEE Std 802.11b (1999).

Wowra, "Approaches to Reduce Energy Consumption of WLAN Devices," Center for Informatics, University of Goettingen 10 pages (2004).

Rohl, "A Short Look on Power Saving Mechanisms in the Wireless LAN Standard Draft IEEE 802.11," Technical University Berlin, Telecommunication Networks Group, 6 pages.

Suh, et al. "Enhanced Power Saving for IEEE 802.11 WLAN with Dynamic Slot Allocation," Graduate School of Information and Communication 10 pages.

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Further Higher Data Rate Extension in the 2.4 GHz Band, IEEE Std 802.11g (2003).

* cited by examiner

ENHANCED HOST SLEEP FOR WLAN DEVICES

CROSS-REFERENCE TO RELATED APPLICATION

The present application claims the benefit of U.S. Provisional Application No. 60/865,331, entitled "Enhanced Host Sleep for WLAN Device," filed on Nov. 10, 2006, which is hereby incorporated by reference herein in its entirety.

FIELD OF TECHNOLOGY

The present disclosure relates generally to communication devices, and more particularly, to techniques for improving power saving operation in a wireless network.

DESCRIPTION OF THE RELATED ART

Wireless networks continue to increase in popularly as consumers migrate toward portable computing device and as manufacturers continue to develop wireless devices with greater functionality. Many consumers routinely install into their homes personal wireless networks that do not enjoy substantial range, but offer considerable bandwidth and ease of installation. On a larger scale, cities have begun deploying wireless networks covering large areas.

There are numerous types of wireless networks and network protocols. Wireless local area networks (WLAN) typically include one of the various Institute of Electrical and Electronics Engineers (IEEE) 802.11 standard wireless protocols, first promulgated in 1999. These protocols include IEEE 802.11a, 802.11b, 802.11n, and 802.11g which operate at different spectrum bands and/or different multiplexing or spread spectrum schemes to deliver various bit rates to devices on the network.

These wireless networks may be deployed in any of a variety of topologies. With WLAN networks, in particular, there are generally two network topologies: ad-hoc topologies and infrastructure topologies. An ad-hoc network (also termed an Independent Basic Service Set—IBSS) is a peer-to-peer network in which devices communicate directly with one another, without the need of a central host. An infrastructure network, on the other hand, uses a host (e.g., a base station or an access point) to route all data between the supported devices. Infrastructure networks allow wireless devices (or clients) to join and disconnect from the network with greater ease and are typically employed in more long term network environments, whereas ad-hoc networks are generally more short term, as the name implies. Either network configuration may support any number of devices including laptop computers, handheld computers, printers, storage media, and other network equipment, such as hosts, routers, switches, etc. In some examples, such as with Bluetooth networks, the wireless devices may be handheld communicators like cellular telephones or walkie-talkies.

Wireless devices may operate using many different power sources. Some may use a constant AC power source, while others may operate off battery power, while others may operate off of either. With the variety of power sources for devices on a network, power consumption has become an important aspect of network operation and thus an important aspect of wireless device operation. Many wireless devices deploy some type of power management protocol that will place the device into a power save mode during periods of non use or reduced use. For example, the IEEE 802.11 standards set forth a power save (PS) mode for wireless devices power in which the devices consume a reduced amount of power from a host. By contrast, in an inactive PS mode, also termed an active or normal operating mode, the wireless devices may sleep or wake as necessarily to receive and transmit packet data on the network.

While devices with PS modes are known, controlling the wireless device sleep state does not conserve power in the underlying host for that device. A WLAN secure digital (SD) card for example may have a selectable PS mode, but the underlying host assembly (e.g., processor assembly in a laptop computer, digital camera, etc.) would still be in an operating mode even though at least with respect to its WLAN capabilities the host would be idle. There is therefore a desirability to have separate sleep modes for both a host assembly and the wireless device connected thereto. Further still, it is desirable to coordinate such sleep modes in a manner that allows each of the assemblies (the host and the wireless device) to be kept in their respective sleep modes while still facilitating a coordinated wake up between the two.

SUMMARY OF THE DISCLOSURE

In one embodiment, a method for controlling operation of a host device in a wireless network that includes at least one wireless device includes communicating an initiation signal from an application executing in the host to a wireless driver of the host device, the wireless driver being selectively coupled to transmit data over a wireless network bus; communicating a first handshake signal from the host to the at least one wireless device to initiate entry into or exit from a host sleep mode; and communicating a second handshake signal from the at least one wireless device to the host device to confirm receipt of the first handshake signal, wherein the host will enter the host sleep mode or exit the host sleep mode after receipt of the second handshake signal.

In another embodiment, an apparatus for communicating with a wireless device on a wireless network comprises a host device including a transmitter, and a device driver to control communication, via the wireless network, of a host handshake signal from the host device to the wireless device and to receive a device handshake signal from the wireless device to the host, where the device driver is coupled to a network bus and wherein the host device selectively enters and exits a host sleep mode under trigger by the device handshake signal from the wireless device.

In another embodiment, an apparatus for controlling operation of a wireless network device that includes a host assembly and an interface for connecting to a wireless device assembly, includes first means for communicating a first handshake signal from a host assembly of the wireless device assembly to initiate entry into or exit from a host sleep mode on the host assembly, wherein the host assembly in the host sleep mode prevents a wireless device assembly from accessing a wireless network bus of the host assembly; and second means for communicating a second handshake signal from a wireless device assembly to the host assembly to confirm receipt of the first handshake signal, wherein the host assembly enters the host sleep mode or exits the host sleep mode in response to receipt of the second handshake signal, wherein the wireless device assembly is communicatively coupled to the host assembly through an interface of the wireless network device.

In another embodiment, an apparatus for controlling operation of a wireless network device that includes a host assembly, includes: the host assembly comprising a processor and an interface for connecting the host assembly to a wireless device assembly; and a machine-readable medium that provides instructions, which when executed by a processor of the apparatus, cause the processor to perform operations comprising, communicating a first handshake signal from the host assembly to the wireless device assembly connected to the interface to initiate entry into or exit from a host sleep mode on the host assembly, and receiving a second handshake signal from the wireless device assembly to confirm receipt of the first handshake signal, wherein the host assembly enters the host sleep mode or exits the host sleep mode in response to receipt of the second handshake signal.

DETAILED DESCRIPTION

Figure 1:
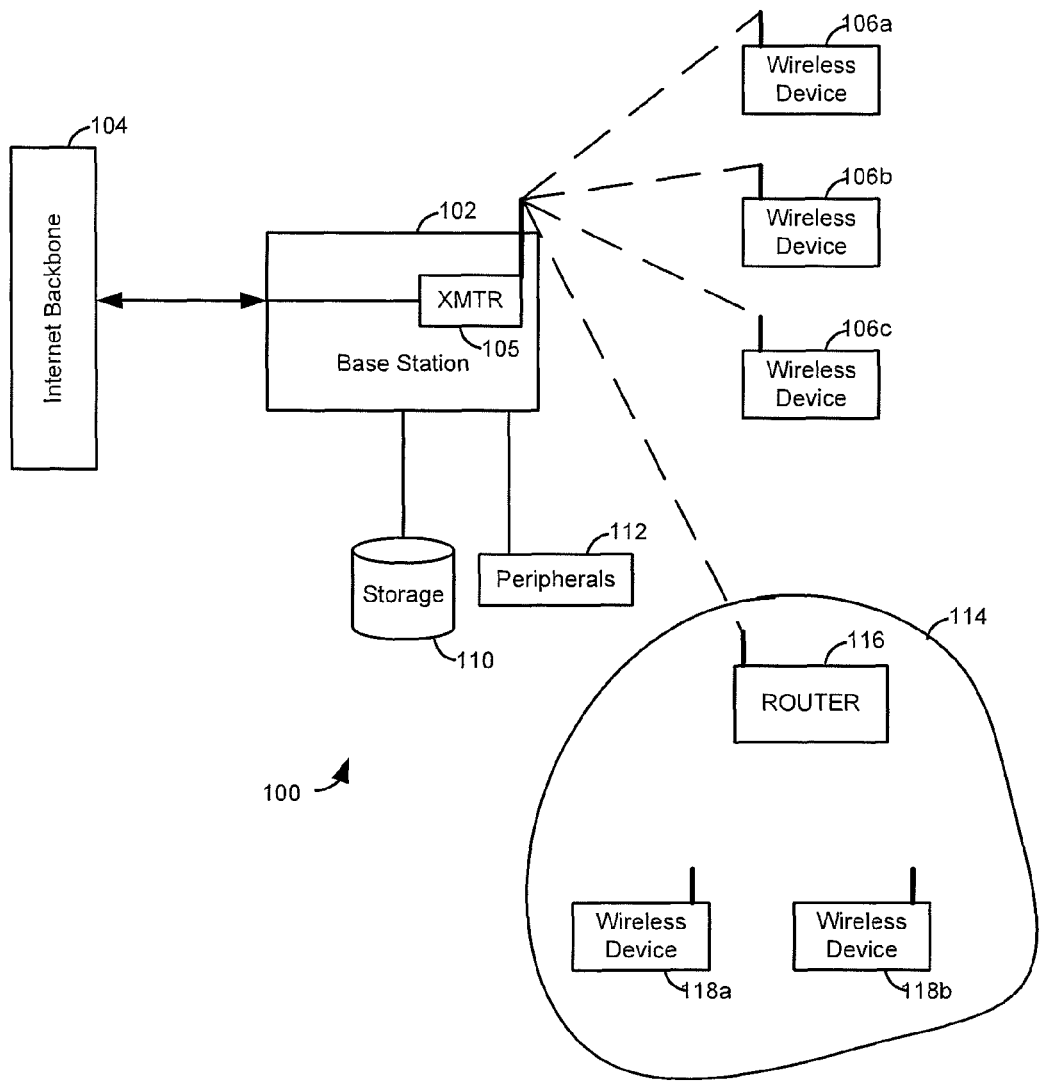
FIG. 1 is a diagram illustrating a wireless network including a host device establishing the wireless network and a plurality of wireless devices coupled to a base station or access point.

FIG. 1 is a block diagram of an example wireless network 100, which may represent a short range or long range network and which is described below as being in an infrastructure topology with a base station 102 serving as a base station or access point. In the illustrated example, the base station 102 represents a computer system that would include a dedicated wireless base station, router, or switch, connected to a main computer. However, the base station 102 may represent in other examples a wireless network card or other hardware that may be inserted into a computer system, router, base station, etc. In a WLAN environment, the base station 102 (as well as the connected wireless devices) may be compliant with one of the accepted or contemplated wireless communications protocols, of which IEEE 802.11a, 802.11b, 802.11g, 802.11n, and Bluetooth, are examples. But these are only provided by way of example. The base station 102 may operate under any wireless protocol desired.

The base station 102 is coupled to an Internet backbone 104, which may contain a series of Internet service providers and act as a network gateway so that the base station 102 is able to transmit and receive data over the Internet. The backbone 104 may be at the premises of the base station 102, as in the case of a wireless base station serving as the network host and coupled to a digital subscribe line (DSL) or cable modem acting as a front user end of Internet backbone 104. But in other examples, the base station 102 may represent a more integrated device with both modulation/demodulation capabilities and wireless routing capabilities and connected directly to the service provide headend acting as the backbone 104.

The base station 102 has a transmitter 105 that communicates with numerous wireless devices (or clients) 106A-106C that each may have software, hardware, or firmware based drivers that allow the respective devices to connect to and communicate via the network using the base station 102 as a routing point or access point. By way of example, the wireless devices 106A-106C may represent wireless terminals, personal handheld devices, laptop computers, wireless supported desktop computers, intelligent phones (e.g., GSM based telephones), gaming systems, or other wireless networking devices, such as routers, switches, etc.

As will be explained below, the wireless devices 106A-106C may include a host device, or assembly, that performs the primary processing functions, and a wireless device assembly, which may be plug insertable into the host assembly and which communicates wirelessly with the base station 102. The host assembly has at least two operating modes, a host sleep (HS) mode and a normal operating mode. The wireless device assembly may have an active power save (PS) mode and an inactive PS mode, where in the later the device is asleep and operating under reduced power consumption.

The active PS mode may be such as that defined in the IEEE 802.11 standard. More broadly, however, the term PS mode herein refers to any mode in which the wireless device assembly is controlled for reduced power consumption operation. Each wireless device may be able to control entry and exit into the PS mode based on its own decisional logic, for example, entering a power save mode after a threshold amount of time without data transmission between the host assembly on the wireless device 106A-106C and the base station 102. Each device 106A-106C may be capable of communicating its operating mode to the base station 102 via status data, which may be transmitted and received on periodic basis, during an allotted time window, or in an unscheduled manner at the initiation of the wireless device.

In some examples, the base station 102 may be programmed to alter (or suggest a change to) the operating mode of the wireless device 106A-106C by communicating an active mode or PS mode instruction to the wireless device in response to this device status data. Various schemes for managing power consumption in and data throughput to a wireless device on a WLAN will be known. Some examples include slotted power saving mechanisms for IEEE 802.11 compliant devices, wherein a time-slotted bandwidth window is used to wake up wireless devices in particular time slots only, during which other wireless devices may enter a PS mode. Other examples include intelligent data packeting and buffering that optimizes data transmission efficiency thereby placing wireless devices in an active mode during periods of data transfer, while reducing the amount of time a wireless device spends in an active mode during periods of no data transfer.

The base station 102 is able to communicate information between the Internet backbone 104 and the wireless devices 106A-106C in response to upstream request data initiated by applications executing on the base station 102 or the wireless devices 106A-106C. The executable applications described herein may represent high level software running in an operating system environment, examples of which would include web-browsers and electronic mail clients. However, the applications 108 may alternatively represent low level software code embedded within an operating system or low level software code (including firmware) executing inside hardware or firmware of the base station 102 or the wireless device 106A-106C. For example, with a cable modem type base station, data transmission can be controlled by physical layer (PHY) applications of the OSI model which operate to collect, packetize, and transmit and receive data on the backbone cable Internet service. In any event, the applications discussed in the figures below, with regard to either a base station or a wireless device, may represent any code hierarchies that are used for transmission and or receipt of data on a network.

In the illustrated example, the base station 102 is also coupled to a storage media 110, such as an external storage drive, and a peripheral 112, such as a printer, either of which may be accessible to a wireless device on the network 100. In the illustrated example, these devices are external and coupled to the base station 102 through wired connections. The base station 102 may also be coupled to another wireless network 114 via a router 116 which is wirelessly connected to devices 118A and 118B, as shown.

Figure 2:
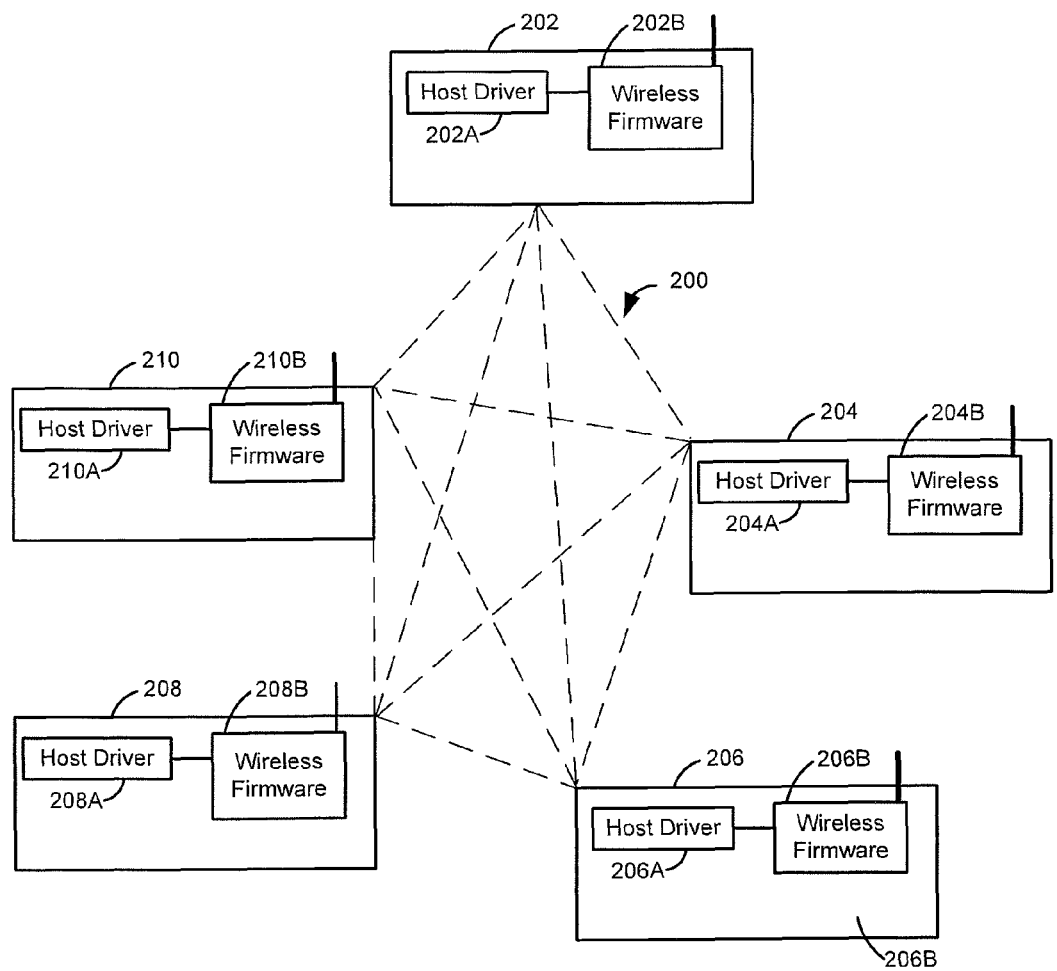
FIG. 2 is a block diagram of a wireless network in an ad-hoc configuration.
Figure 2:
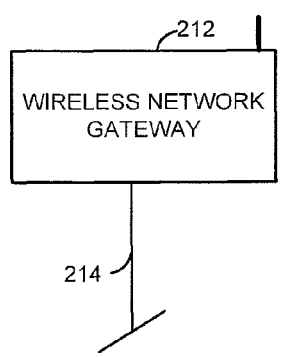

FIG. 2 illustrates an ad-hoc or peer-to-peer network 200 comprising independently communicating devices 202-210 forming the ad-hoc network 200 and capable of communicating directly with one another. The devices 202-210 include host drivers 202A-210A, respectively, each coupled to a wireless assembly 202B-210B to establish and maintain the ad-hoc network 200. In the illustrated configuration, each wireless device 202-210 may have a PS mode with respect to the ad-hoc network 100, i.e., where one or more of the devices would not be able to communicate with other devices, while each wireless device 202-210 could still operate in an active mode with respect to the gateway 212. In an ad-hoc topology, each of the clients 202-210 will operate as a separate node capable of communicating data to the other nodes, and these nodes 202-210 may support local devices connected thereto. In an ad-hoc topology, the local devices may or might not be able to communicate directly with other nodes on the ad-hoc network.

In each of the above examples, each wireless device may include a host assembly that is capable of operating under either an active mode or a host sleep (HS) mode, separate from whether the wireless device assembly is in a PS mode or not. The HS mode allows the host assembly to fully go to sleep or to simply establish that regardless of the operating mode of the wireless device assembly, there must be a wakeup interrupt received at the host from the wireless assembly connected thereto before the host will awake from the S mode and send data.

Figure 3:
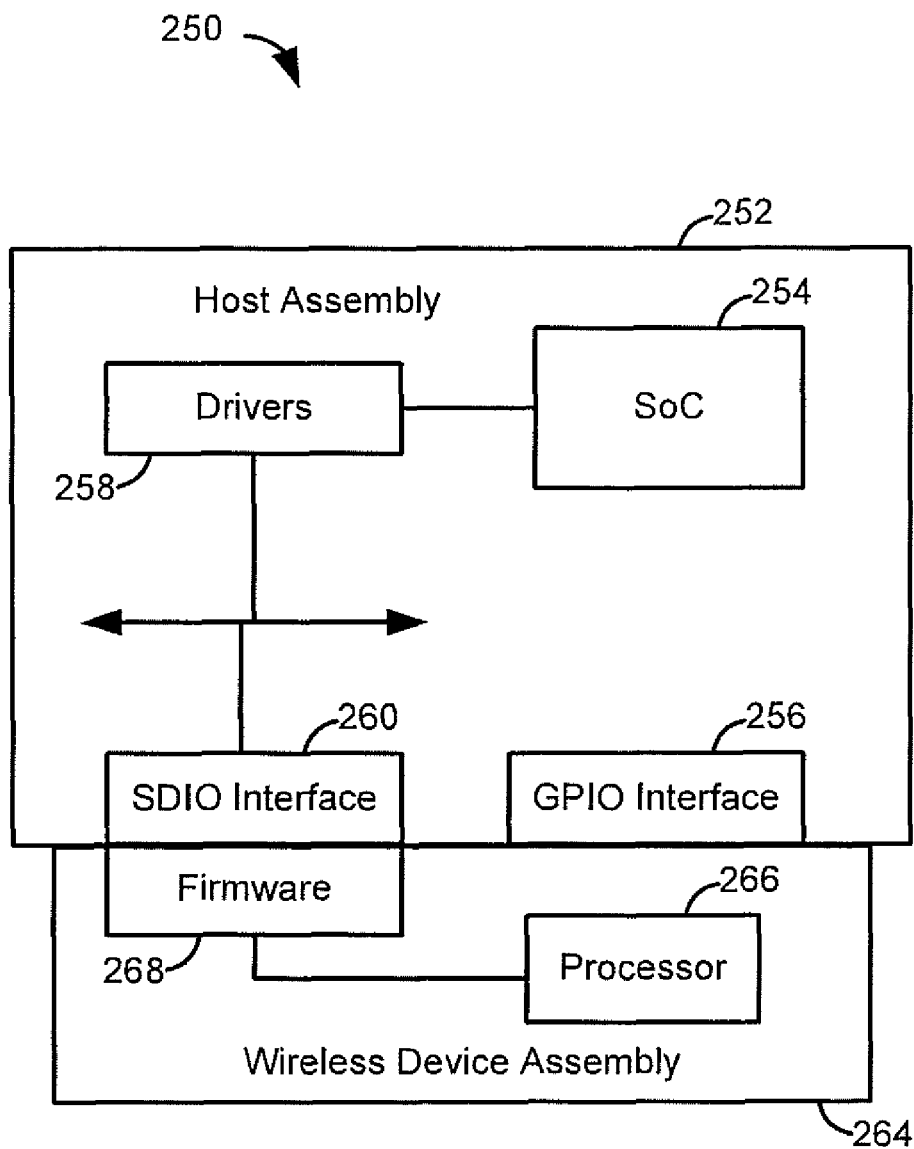
FIG. 3 is a block diagram of a wireless device having a host assembly and wireless device assembly connected thereto as may be used in an infrastructure or ad-hoc network configuration.

FIG. 3 illustrates an example implementation of a wireless device 250 that may be used in any of the network configurations of FIG. 1 or 2, for example. The wireless device 250 comprises a host assembly 252 which includes a system on a chip (SoC) assembly that processes packet data received a wireless network. The SoC assembly 254 may include a SoC processor, memory interface, and memory for buffering received packet data for decoding and analysis. Different types of memories may be used for the memory, including double data rate (DDR) memory, flash memory, etc. The memory interface may be provided as an interface corresponding to the memory (e.g., a DDR memory interface, flash memory interface, etc.).

The host assembly 252 may further include additional components, such as a test action port, e.g., joint task action group (JTAG) port (not shown), an input/output interface (e.g., a general purpose input/output (GPIO) interface 256), or a receiver and/or transmitter, e.g., universal asynchronous receiver/transmitter (UART) (not shown).

The host assembly 252 further includes a host driver 258 that interfaces with a secure digital input/output (SDIO) interface 260 connected thereto via a SDIO bus 262. The SDIO interface 260 connects the host assembly 252 to a wireless device assembly 264, which may be a WLAN device capable of communicating over a wireless network with an access point, such as a base station, although in other examples, the WLAN device assembly 264 may function as an access point. In the illustrated example, the assembly 264 includes a central processor or chipset 266 controlling operation of the assembly 264 along with firmware 268 that controls the interfacing and handshaking (to be described further below) between the device assembly 264 and the host assembly 252.

As noted above, the device assembly 264 may operate under an inactive PS mode. The typical cases are as follows. The wireless device assembly 264 is not associated with any access point 102. The device assembly 264 is associated with access point 102 but the host assembly 252 never issues a PS command to device assembly 264. The host assembly 252 has tried to issue a PS command to device assembly 264 but the command is blocked in a host driver for some reason. For example, in an ad-hoc topology when an ad-hoc traffic indication map (ATIM) window is set to 0 indicating that PS mode is not used.

In any of these examples, the host assembly 252 may be able to enter an HS mode in which case the host assembly 252 would still be able to go to sleep or if not asleep yield SDIO bus 262 access to another device, such as another Wi-Fi, Bluetooth, GPS, or other device connected to the bus 262.

In examples herein, the host assembly 252 and the wireless device assembly 264 are able to enter sleep modes (an HS mode or PS mode respectively) and coordinate such entry through a handshaking procedure, which in some examples includes two steps, configuration and activation. Each of these assemblies may also be able to wakeup the other through sending a wakeup interrupt signal of some sort, after which a handshaking procedure is entered.

The wireless device assembly 264, e.g., the firmware 268, may deliver a wakeup interrupt to the host assembly 252 separately through the GPIO interface 256 or other method, for example upon receipt of packet data from the base station indicating that the corresponding wireless device should wake up from its PS mode.

The HS mode of the wireless device assembly 264 may be configured and controlled through a handshaking between the host driver 258 and the firmware 268. For example, the device assembly 264 may be programmed to refrain from completely entering the HS mode or from waking up from the HS mode, until the host assembly 252 has communicated (and the assembly 264 received) a sleep confirmation signal or an activation signal. In this way, full entry to and exit from the HS mode may be achieved by a handshaking whether in an infrastructure or ad-hoc topology.

Figure 4:
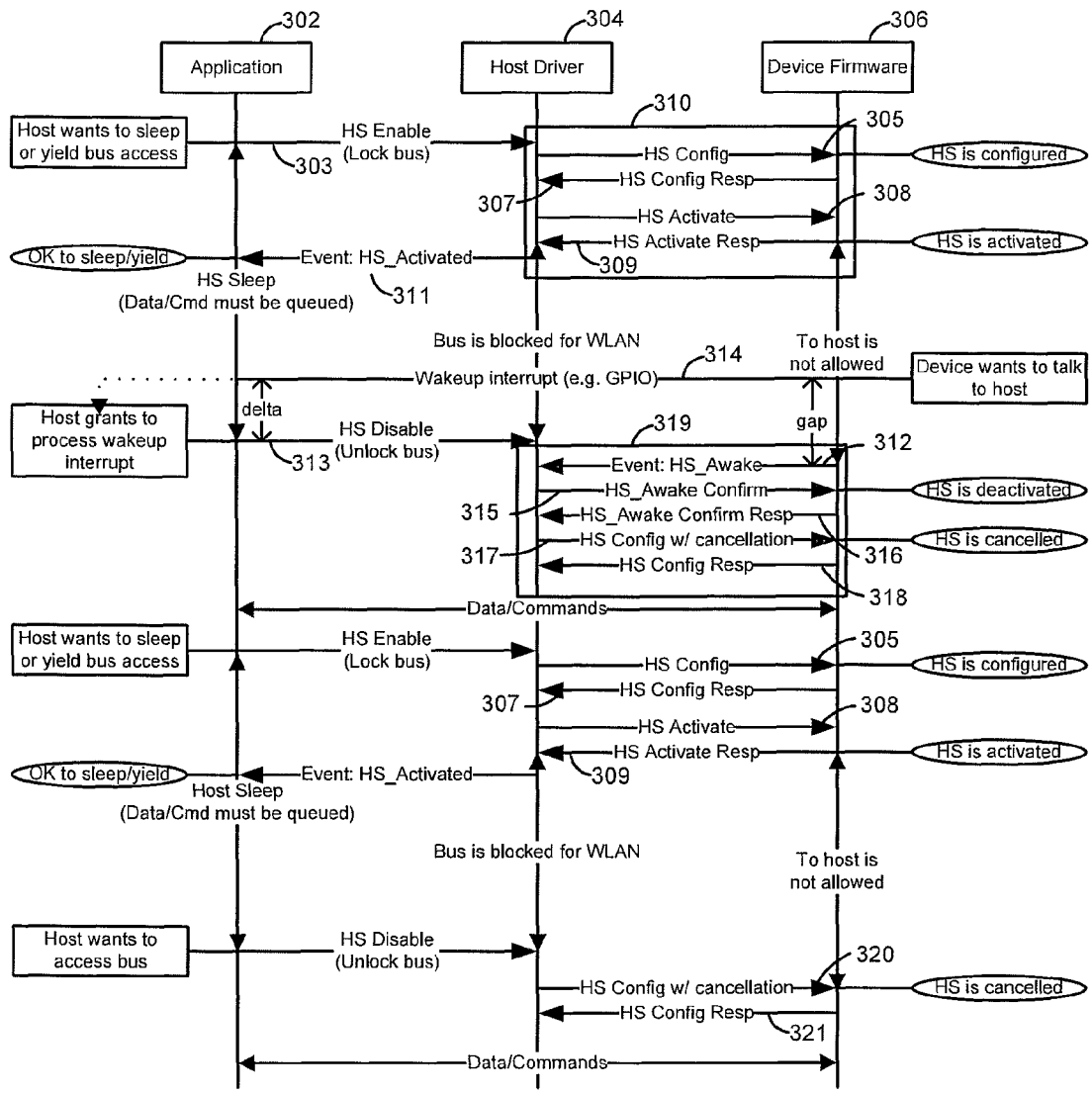
FIG. 4 is a diagram of an example host sleep mode implementation for a wireless network device in which the wireless device assembly is in an inactive power save mode.

FIG. 4 illustrates an example implementation of a HS mode for wireless device firmware. An application 302 running on a host assembly generates an initial enable (HS_ENABLE) signal 303, instructing a SDIO/WLAN host driver 304 that an HS mode is to be entered. For example, the application 302 may be programmed to determine when it is desirable for entry into a HS mode based on the activity like network traffic. The host driver 304 then issues a configuration (HS_CONFIG) command 305 to the wireless device assembly firmware 306, indicating that the host assembly 252 desires to enter an HS mode.

When the host driver 304 enters a HS mode the host assembly may relinquish control of the SDIO interface to another device coupled to the host assembly. The host and device handshaking restrains the host driver 304 from immediately activating an HS mode upon receipt of the HS_ENABLE signal 303. Instead, a HS_CONFIG signal 305 is transmitted, and then the firmware 306 configures itself based on the request for an HS mode, and responds to the host driver 304 with a configuration response HS_CONFIG_RESP 307 signal. The host driver 304 then enters the HS mode and issues an activate signal HS_ACTIVATE 308 signal after receiving the HS_CONFIG_RESP signal 307, which activate signal 308 instructs the device assembly firmware 306 that the host driver 304 has entered the HS mode. The device firmware 306 responds with an HS_ACTIVATE_RESP signal 309. The signals 305, 307, 308 and 309 may be considered part of a host sleep mode handshaking communication protocol 310 between the host driver 304 and the wireless device assembly firmware 306.

After the host driver 304 enters the HS mode, the driver 304 communicates to the application 302 that the HS mode has been activated by sending an activation confirmation signal HS_Activated 311.

In the HS mode, the host assembly would block the wireless device assembly from communicating on the wireless interface, e.g., an SDIO interface. In the example of FIG. 3, the wireless device assembly 264 would be precluded from accessing the host assembly bus 262 or the SoC assembly 254 more generally, and the host assembly 252 would be allowed to remain in a PS mode. Instead, the host assembly 252 could allow another network device, such as a GPS, Wi-Fi, or Bluetooth device coupled to the bus 262, to access the bus 262. Also, while in the HS mode, any commands or data from the application 302 executing on the host assembly would be queued because such information would not be communicated to the wireless device assembly as the assembly would be in the HS mode.

If the wireless device assembly wants to communicate with the host driver 304, the firmware 306 must generate an awake (HS_AWAKE) signal 312 and send that signal to the host driver 304. As shown in FIG. 4, the device firmware 306 cannot immediately send its wakeup signal to the host assembly, but must wait for a gap period of time set forth in the HS_CONFIG data signal 305 sent from the host driver 304. The application sends the host driver 304 a disable signal HS_DISABLE signal 313 in response to a wakeup interrupt signal 314 from the device firmware 306, which may be communicated directly through a connection such as a GPIO interface.

The host driver 304 responds to the awake request by sending an HS_AWAKE_CONFIRM signal 315 to the device firmware 306, which confirms the host's receipt of the interrupt command and exit from the HS mode. If such a confirmation signal is not received, then the device firmware 306 may be programmed to repeat the wakeup interrupt signal broadcast after a given period of time. In general the wakeup signals may be initiated by the receipt of packet data over a wireless network. In response to the confirmation signal 315, the device firmware 306 enters a full communication mode and sends a response signal 316 (HS_AWAKE_CONFIRM_RESP) indicating that the device firmware 305 is ready for communication with the host driver 304. The host driver 304 now allows the wireless device to access the network bus, and then sends an HS_CONFIG cancellation signal 317 to the device firmware 306, which confirms receipt of the signal via an HS_CONFIG_RESP signal 318. These signals form a wakeup handshaking protocol 319 for the HS mode. As shown data and commands may now be sent in this mode.

While the device firmware may initiate the handshaking process to disable the HS mode on the host assembly and the PS mode on the wireless device assembly, the host driver 304 may at any time initiate wakeup from the HS mode and wake up the device firmware 306 by sending a disable signal to the device firmware 306 through a SDIO/WLAN interface, a GPIO interface, or other means. The host driver 304 may do this at any time by sending an HS_CONFIG with cancellation signal 320 (similar or like that of signal 317) to the device firmware 306, which confirms receipt by sending an HS_CONFIG_RESP signal 321 back to the host driver 304. That is, in this example, the host has deactivated the HS mode by sending a disable parameter, after which the host 304 may begin sending packet data or other commands to the device firmware 306. In other examples, the device firmware 306 may be programmed to terminate the HS mode upon receipt of packet data or commands directly, without the need for a disable command.

Figure 5:
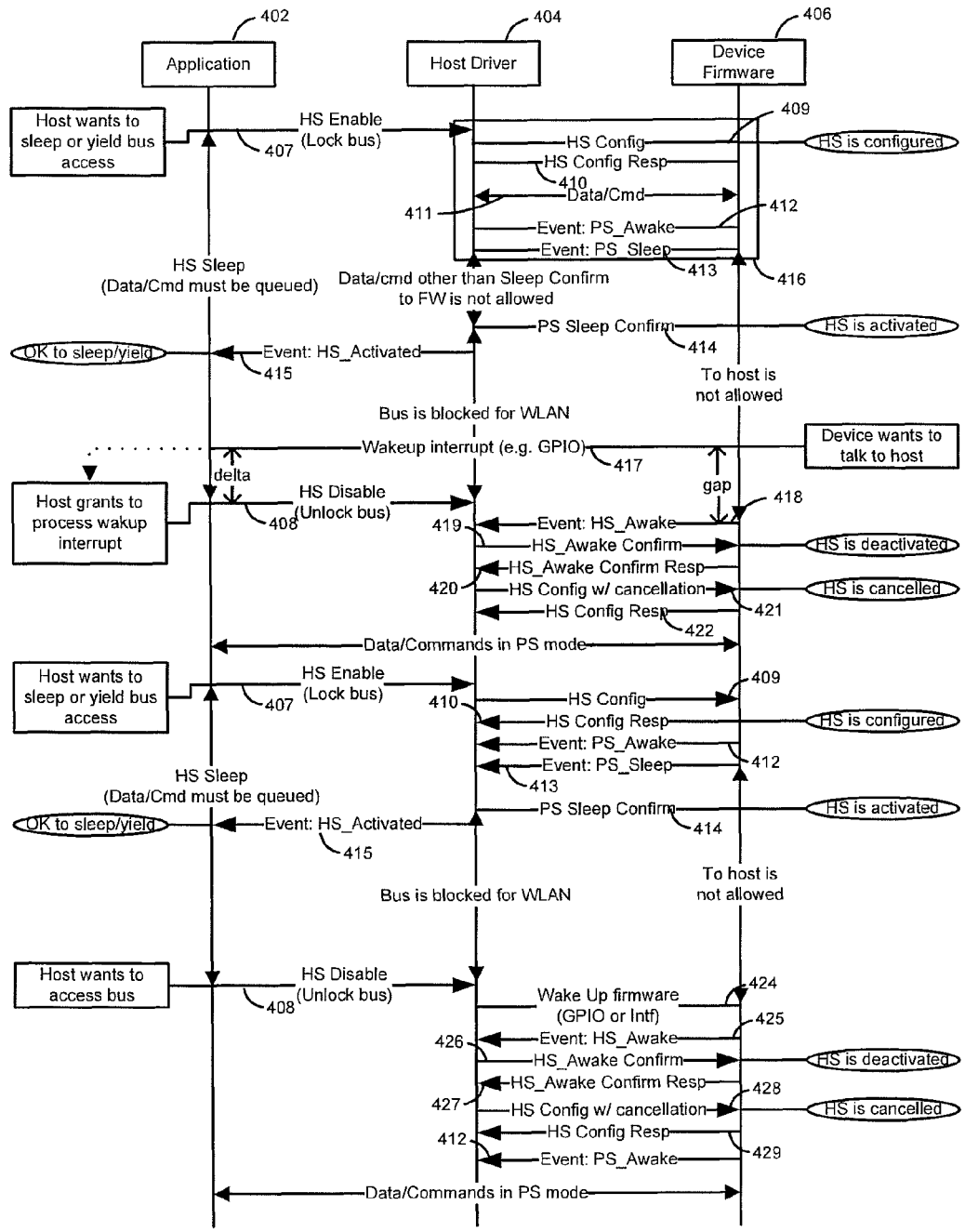
FIG. 5 is a diagram of an example host sleep mode implementation for a wireless network device in which the wireless device assembly is in an active power save mode.

FIG. 5 illustrates a HS mode that may be used when the device firmware is in an active PS mode, i.e., where the device firmware is able to periodically to go to sleep and wake up. As with the other examples described herein, the mode could be used in infrastructure and ad-hoc topologies.

Generally speaking, the wireless device assembly will communicate its operating mode to the host assembly through a status signal such as a PS_AWAKE and PS_SLEEP, which may be periodically sent over an SDIO interface. To affect handshaking, the host driver responds with a confirmation command (e.g., PS_SLEEP_CONFIRM) acknowledging receipt of the status signal (e.g., PS_SLEEP), and in some cases thereby controlling the device firmware's entry into the PS mode by awaiting handshake completion before entry.

The configuration of FIG. 5 is similar to that of FIG. 4 and includes an application 402, a host driver 404, and a wireless device firmware 406. As with FIG. 4, the host device features may be implemented in a host driver, and the wireless device features may be implemented in firmware in that device. Although, implementations may be achieved in any hardware, software, or firmware of either of these network devices. As illustrated, the application 402 transmits an enable HS_ENABLE signal 407 or a deactivation HS_DISABLE signal 408 to the host driver 404 in a similar manner to that of the configuration of FIG. 4. Handshaking between the host driver 404 and the wireless device firmware 406, however, is different than that described in FIG. 4, because in general with the wireless device assembly being in a PS mode or attempting to enter a PS mode, the device firmware 406 does not configure itself in response to the signal from the host driver as occurred in the example of FIG. 3.

To enter an HS mode, the application 402 sends HS_ENABLE signal 407 advising the host driver 404 of the desire to enter the HS mode. The host driver 404 then enters into a handshake with the wireless device firmware 406. The first part of the handshake is a configuration handshake. The host driver 404 sends an HS_CONFIG signal 409 to the device firmware 406, which records that information and acknowledges receipt by sending a response signal HS_CONFIG_RESP signal 410.

The device firmware 406 advises the host of its operating state by sending a PS_AWAKE signal 412 or a PS_SLEEP signal 413 indicating that the device firmware 406 is awake (or awakening) or gone asleep (or going to sleep), respectively, which the firmware 406 may communicate through an SDIO interface. Upon receipt of the PS_SLEEP signal 413, the host driver 404 enters a HS mode and sends a confirmation signal PS_SLEEP_CONFIRM signal 414 confirming the same. The host driver 404 sends an announcement signal to the application 402 as a HS_ACTIVATED signal 415 to advise of entry into the HS mode. These signals form an activation handshake protocol 416.

The HS mode wakeup occurs in a similar manner to that of FIG. 4. A wakeup interrupt signal 417 is sent from the wireless device assembly to the application 402, e.g., through a GPIO, as the SDIO interface is not accessible in an HS mode. The application 402 sends an HS_DISABLE signal 408 to the host driver 404 which unlocks the SDIO bus allowing the WLAN device firmware to access the bus for communication between the host and wireless device assemblies. After sending a wakeup interrupt 417 signal, the device firmware 406 waits a predetermined length of time, set by the HS_CONFIG signal 409, and then sends an awake request HS_AWAKE signal 418 to the host driver 404, which exits the HS mode completely responds with an awake confirmation HS_AWAKE_CONFIRM signal 419, after which the wireless device assembly deactivates the HS mode. The device firmware 406 then sends a confirmation response HS_AWAKE_CONFIRM_RESP signal 420 as part of a confirmation handshake portion. After the confirmation handshake portion has been completed and the HS mode deactivated, the host driver 404 and device firmware 406 enter into a configuration handshake, where the host driver 404 sends a configuration cancellation HS_CONFIG cancellation signal 421 to the device, and the device firmware 406 sends a response HS_CONFIG_RESP signal 422 to the host 404.

The host assembly may initiate wakeup as well by having the application 402 initiate and send the host driver 404 the HS_DISABLE signal 408 without receipt of the interrupt from the wireless device firmware 406. The host driver 404 sends a wakeup signal 424 to the device firmware 406, for example through a GPIO or other interface, which is used because direct access to a wireless device firmware is not allowed when a device is in an active PS mode. The device firmware 406 responds with an HS_AWAKE signal 425 indicating to the host 404 that the HS mode may be deactivated. The host 404 sends an HS_AWAKE_CONFIRM signal 426 indicating that the HS mode has been exited and the device firmware 406 sends an HS_AWAKE_CONFIRM_RESP signal 427. The device firmware 406 and host driver 404 then enter a configuration handshake portion to cancel the configuration changes that resulted from the HS mode. The host driver 404 sends an HS_CONFIG with cancellation signal 428 to the device firmware 406, which responds with an HS_CONFIG_RESP signal 429. Upon cancellation of the HS mode, the device firmware 406 also awake from the PS mode and thus sends the PS_AWAKE signal 412 confirming the same to the host driver 404.

Figure 6:
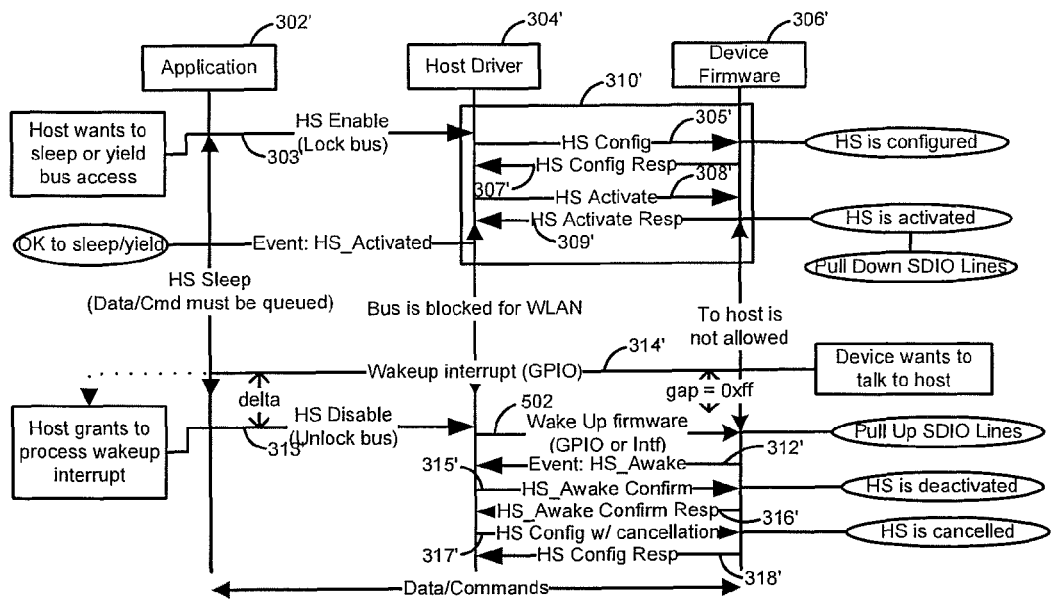
FIG. 6 is a diagram of an example host sleep mode implementation similar to that of FIG. 4 but in which there is no fixed gap time that the wireless device assembly will wait before handshaking with the host assembly.

FIG. 6 illustrates a different HS mode, termed an HS extended mode. In FIGS. 4 and 5, the response time until a wakeup interrupt is sent from the host assembly to the wireless device assembly on a GPIO or other interface is predictable and less than the gap configured in the HS_CONFIG command signal. This allows the wireless device assembly to send its awake HS_AWAKE signal to the host directly through the SDIO interface, after the gap time period.

In some embodiments, however, the response time from the host will not be predictable, therefore an enhanced HS mode may be used where, even after sending a wakeup interrupt, the device assembly is prevented from the entering an awake operating mode until the host assembly instructs the device firmware to do so. For example, a gap time data may be set to a special value (e.g., 0xff) that indicates to the wireless device assembly that there is no gap time and that the wireless device assembly must await an interrupt/notification from the host assembly before waking up.

The extended HS mode is implemented when the response time of the wireless device is unknown at the host assembly. Instead of having the host assembly await an awake signal from the wireless device assembly, upon receiving the request to open the WLAN bus, the host assembly polls the wireless device assembly to trigger the device to transmit an awake request. Because the mode of FIG. 6 is similar to that of FIG. 4 like reference numerals will be used for like command signals.

In the examples discussed herein, the gap is set to 0xff (or 255 in decimal value) and is stored in a memory location within the device firmware. The firmware having a gap equal to 0xff is programmed to refrain from sending the HS_AWAKE signal 312' to the host driver 304' until a wakeup notification or interrupt signal 502 is received from the host driver 304'. The host driver 304' may send the wakeup notification or interrupt signal 502 through the SDIO interface (e.g., in the Power bit in the Configuration Register) or through the GPIO interface at any point to awaken the device firmware 306'. But the device firmware 306' will not awaken, or send its HS mode wakeup signal, until that wakeup interrupt signal is received. In either situation, the same processing may occur for both inactive PS mode and active PS mode.

FIG. 6 illustrates an HS mode with a gap equal to 0xff and with the wireless device firmware 306' in an inactive PS mode. The HS mode initiation is similar to the operation of the inactive PS mode shown in FIG. 4. Except, in the enhanced mode, after receiving the HS_ACTIVATE signal 308' from the host driver 304', the device firmware 306' pulls down all SDIO lines to avoid current leakage. Furthermore, when the HS mode is active, the device firmware 306' is prevented from waking up until the host 304' sends the wakeup firmware signal 502'. That is, there is no automatic gap time countdown, after which the device is allowed to resume wireless communications with the host. When the device firmware 306' receives the wakeup signal, the devices pulls up all the SDIO lines to place the device assembly into a wireless transmission ready mode, and then the device firmware 306' is able to initiate HS deactivation handshaking and HS cancellation handshaking as described above.

Figure 7:
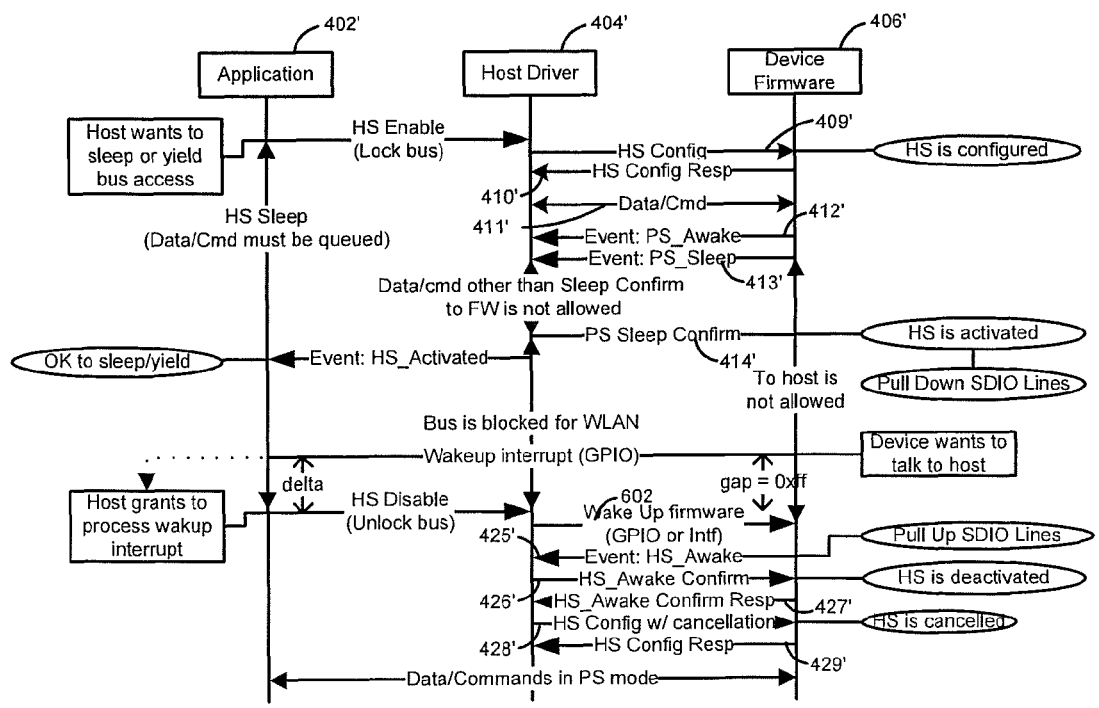
FIG. 7 is a diagram of an example host sleep mode implementation similar to that of FIG. 5 but in which there is no fixed gap time that the wireless device assembly will wait before handshaking with the host assembly.

FIG. 7 illustrates an enhanced HS mode for a wireless device assembly in an active PS mode and operating with a similar process to that of FIG. 5, and thus similar reference numerals are used. Interaction between an application 402' and the host driver 404' is as described above. Interaction between the host driver 404' and the device firmware 406' is as described above as well, except that the upon receipt of the PS_SLEEP_CONFIRM signal 414', the HS mode is activated in the wireless device firmware 406' which pulls down all the SDIO lines to further conserve power consumption. Upon wakeup, the device firmware 406' is prevented from waking up (no matter than the length of time elapsed) until a wakeup interrupt signal 602 is sent from the host driver 404' to the device firmware 406' and in response to the HS_DISABLE signal 407. After the wakeup interrupt signal 602 is received, the device firmware 406' pulls up the SDIO lines.

Figure 8:
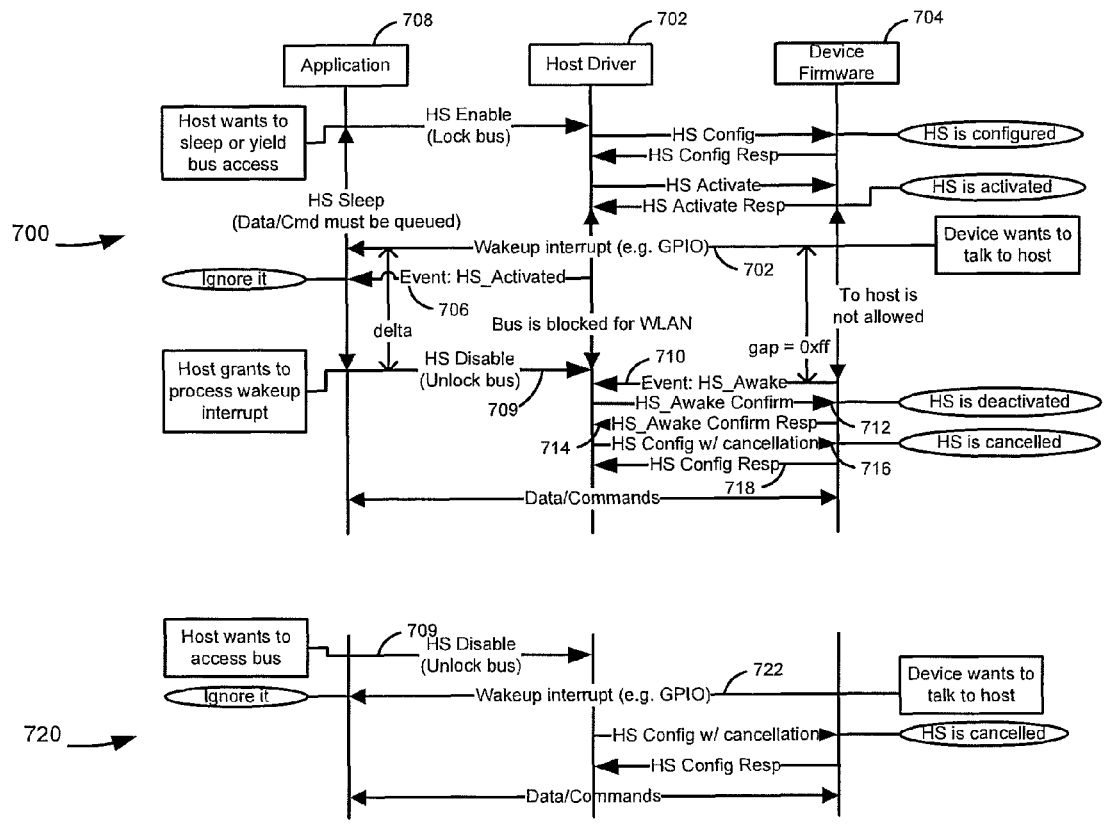
FIG. 8 is a diagram of an example host sleep mode implementation when wakeup interrupt signals are crossed with host sleep mode activation signals.

FIG. 8 illustrates another example HS mode implementation, but in which wakeup interrupts are received out of order. In a HS mode enable implementation 700, a host driver 702 and wireless device firmware 704 go through a configuration and activation handshake like that discussed in examples above. Yet, in the cross communication scenario illustrated, the device firmware 704 sends a wake interrupt signal 705 before an HS_ACTIVATED signal 706 has been communicated to application 708. In this situation, the application 708 is programmed to ignore the HS_ACTIVATED signal 706.

That is the host driver 702 is not put to sleep and does not yield bus access upon receipt of the HS_ACTIVATED signal 706. Instead, that signal 706 is ignored, and the application 708 sends a confirming HS_DISABLE signal 709 to the host driver 702, after which the HS deactivation handshake (signals 710-714) and the HS cancellation handshake (signals 716 and 718) are implemented between the host driver 702 and the device 704.

An HS mode disable configuration 720 is also shown, where a wakeup interrupt signal 722 from the device 706 reaches the host application 708 after the HS_DISABLE command 709 is sent to the host driver 702. The application 708 ignores this wakeup interrupt from the device firmware 704, i.e., any waking up interrupt signal 722 received after a command signal to disable the HS mode should be ignored.

As described, the various techniques described above may be implemented in hardware, firmware, software, or a combination of hardware, firmware, and/or software. When implemented in software, the software may be stored in any computer readable memory such as on a magnetic disk, an optical disk, or other storage medium, in a RAM or ROM or flash memory of a computer, processor, integrated circuit, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for controlling operation of a wireless network device that includes i) a host assembly and ii) a wireless device assembly, wherein the host assembly includes an interface for connecting to a wireless device assembly, and wherein the wireless device assembly is for communicating wirelessly with another device, the method comprising:

communicating a first handshake signal from the host assembly to the wireless device assembly to initiate entry into or exit from a host sleep mode on the host assembly, wherein the wireless device assembly has an active power save mode and an inactive power save mode; and communicating, via the interface, a second handshake signal from the wireless device assembly to the host assembly, in response to the first handshake signal, to confirm receipt of the first handshake signal, wherein the second handshake signal is communicated to the host assembly by the wireless device assembly to indicate whether the wireless device assembly is currently in the active power save mode or whether the wireless device assembly is currently in the inactive power save mode, and wherein the host assembly enters the host sleep mode or exits the host sleep mode i) in response to receipt of the second handshake signal and ii) whether the wireless device assembly is in the active power save mode or the inactive power save mode and wherein the host assembly relinquishes control of the interface on entering the host sleep mode.

2. The method of claim 1, wherein to enter the host sleep mode:

communicating the first handshake signal includes communicating a host sleep mode configuration signal from the host assembly to the wireless device assembly; and communicating the second handshake signal includes communicating a host sleep mode configuration response signal from the wireless device assembly to the host assembly.

3. The method of claim 2, wherein:

communicating the first handshake signal further includes communicating a host sleep mode activation signal from the host assembly to the wireless device assembly;

communicating the second handshake signal further includes communicating a host sleep mode activation response signal from the wireless device assembly to the host assembly; and the method further includes the host assembly entering the host sleep mode in response to receipt of the host sleep mode activation response signal.

4. The method of claim 3, wherein the interface includes a plurality of lead lines, and wherein the wireless device assembly pulls down current on each of the plurality of lead lines of the interface in the host sleep mode.

5. The method of claim 2, wherein the wireless device assembly is in an inactive power save mode, and wherein the host assembly in the host sleep mode prevents the wireless device assembly from accessing a wireless network bus of the host assembly.

6. The method of claim 1, wherein the wireless device assembly is in a power save mode, and wherein the host assembly in the host sleep mode prevents the wireless device assembly from accessing a wireless network bus of the host assembly.

7. The method of claim 1, wherein to initiate exit from the host sleep mode, the method further comprises:

communicating an awake signal from the wireless device assembly to the host assembly;

exiting the host sleep mode in response to receipt of the awake signal;

communicating an awake confirmation signal from the host assembly to the wireless device assembly; and communicating a host awake confirmation response signal from the wireless device assembly to the host assembly.

8. The method of claim 7, further comprising:

communicating a host sleep mode configuration cancellation signal from the host assembly to the wireless device assembly; and communicating a host sleep mode configuration cancellation response signal from the wireless device assembly to the host assembly.

9. The method of claim 7, further comprising:
communicating an interrupt signal from the wireless device assembly to the host assembly; and
the wireless device assembly awaiting a specified gap time before sending the awake signal, where the gap time is based on host sleep mode configuration data.

10. The method of claim 9, further comprising the host assembly ignoring the interrupt signal when the interrupt signal is received before the host assembly entered the host sleep mode.

11. The method of claim 1, wherein the wireless device assembly is in an active power save mode, and wherein to enter the host sleep mode, the method further comprises:
communicating a host sleep mode configuration signal from the host assembly to the wireless device assembly;
communicating a host sleep mode configuration response signal from the wireless device assembly to the host assembly;
communicating a wireless device assembly status signal to the host assembly;
in response to the wireless device assembly status signal indicating that the wireless device assembly is in an power save mode, activating the host sleep mode in the host assembly; and
in response to the wireless device assembly status signal indicating that the wireless device assembly is in an inactive power save mode, not activating the host sleep mode.

12. The method of claim 11, further comprising communicating a sleep confirmation signal from the host assembly to the wireless device assembly after receipt of the wireless device assembly status signal.

13. The method of claim 1, wherein the wireless device assembly is in a power save mode, and wherein to initiate exit from the host sleep mode, the method further comprises:
sending a wakeup interrupt from the wireless device assembly to the host assembly;
unlocking a wireless network bus in the host assembly;
communicating a wakeup signal from the wireless device assembly to the host assembly; and
in response to receiving the wakeup signal, communicating a host sleep mode awake signal from the wireless device assembly to the host assembly, the host assembly exiting the host sleep mode and communicating a host sleep mode awake confirmation signal to the wireless device assembly.

14. The method of claim 1, wherein communication between the host assembly and the wireless device assembly is achieved between a driver block within the host assembly and firmware in the wireless device assembly.

15. An apparatus for communicating with a wireless device on a wireless network via a wireless device assembly, the apparatus comprising:
a host assembly including a wireless device interface and a host driver i) to control communication, via the interface, of a host handshake signal from the host assembly to the wireless device assembly connected to the interface, and ii) to receive a device handshake signal from the wireless device assembly to the host assembly,
wherein the wireless device assembly has an active power save mode and an inactive power save mode,
wherein the device handshake signal is generated in response to the host handshake signal, to confirm receipt of the host handshake signal,
wherein the device handshake signal indicates whether the wireless device assembly is currently in the active power save mode or whether the wireless device assembly is currently in the inactive power save mode,
wherein the host assembly selectively enters and exits a host sleep mode in response to handshaking between the host assembly and the wireless device assembly, where the handshaking occurs whether the wireless device assembly is in the active power save mode or the inactive power save mode, and
wherein the host assembly and the wireless device assembly define a node in the wireless network.

16. The apparatus of claim 15, wherein the host assembly is to send a host sleep mode configuration signal in the host handshake signal and await a host sleep mode configuration response signal before entering a host sleep mode.

17. The apparatus of claim 16, wherein the host assembly is to send a host sleep mode activation signal in the host handshake signal and wherein the host assembly is to await a host sleep mode activation response signal before entering the host sleep mode.

18. The apparatus of claim 16, wherein the host sleep mode configuration signal includes time data that defines a time gap between sending a host sleep mode interrupt signal and a host sleep mode awake signal.

19. The apparatus of claim 15, wherein in the host sleep mode the host assembly prevents the wireless device assembly from accessing a wireless bus within the host assembly.

20. The apparatus of claim 15, wherein the host assembly is to communicate the host handshake signal before receiving the device handshake signal.

21. The apparatus of claim 15, wherein the host assembly is to communicate the host handshake signal in response to receiving the device handshake signal.

22. An apparatus for controlling operation of a wireless network device that includes i) a host assembly, ii) a wireless device assembly for communicating wirelessly with another network device, and iii) an interface for connecting the host assembly to the wireless device assembly, the apparatus comprising:
first means for communicating a first handshake signal from a host assembly of the wireless device assembly to initiate entry into or exit from a host sleep mode on the host assembly, wherein the host assembly in the host sleep mode prevents the wireless device assembly from accessing a wireless network bus of the host assembly; and
second means for communicating a second handshake signal from a wireless device assembly to the host assembly to confirm receipt of the first handshake signal, wherein the second handshake is communicated to the host assembly by the wireless device assembly, in response to the first handshake signal, to indicate whether the wireless device assembly is currently in the active power save mode or whether the wireless device assembly is currently in the active power save mode and wherein the host assembly enters the host sleep mode or exits the host sleep mode in response to receipt of the second handshake signal, and wherein the wireless device assembly is communicatively coupled to the host assembly through the interface of the wireless network device and wherein the host assembly relinquishes control of the interface on entering the host sleep mode.

23. The apparatus of claim 22, further comprising:
for entering the host sleep mode, 1) a third means for communicating a host sleep mode configuration signal and a host sleep mode configuration response between the wireless device assembly and the host assembly, and 2) a fourth means for communicating a host sleep mode activation signal and a host sleep mode activation response signal between the wireless device assembly and the host assembly; and for exiting the host sleep mode, 1) a fifth means for communicating an awake signal and an awake confirmation response signal between the host assembly and the wireless device assembly, and 2) sixth means for communicating a host sleep mode configuration cancellation signal and a host sleep mode configuration cancellation response signal between the host assembly and the wireless device assembly.

24. An apparatus for controlling operation of a wireless network device that includes a i) host assembly and ii) a wireless device assembly for communicating wirelessly with another network device, wherein the wireless device assembly has an active power save mode and an inactive power save mode, the apparatus comprising:

the host assembly comprising a processor and an interface for connecting the host assembly to the wireless device assembly; and a machine-readable medium that provides instructions, which when executed by a processor of the apparatus, cause the processor to perform operations comprising, communicating a first handshake signal from the host assembly to the wireless device assembly connected to the interface to initiate entry into or exit from a host sleep mode on the host assembly, and receiving a second handshake signal from the wireless device assembly, in response to the first handshake signal, to confirm receipt of the first handshake signal, wherein the second handshake signal is communicated to the host assembly by the wireless device assembly to indicate whether the wireless device assembly is currently in the active power save mode or whether the wireless device assembly is currently in inactive power save mode and wherein the host assembly enters the host sleep mode or exits the host sleep mode i) in response to receipt of the second handshake signal and ii) whether the wireless device assembly is in the active power save mode or the inactive power save mode and wherein the host assembly relinquishes control of the interface on entering the host sleep mode.

25. The apparatus of claim 24, wherein the interface is communicatively coupled to a firmware of the wireless device assembly for communicating the first handshake signal to the firmware and for receiving the second handshake signal from the firmware.

* * * * *